United States Patent [19]

Krude

[11] Patent Number: 4,568,314

[45] Date of Patent: Feb. 4, 1986

[54] UNIVERSAL JOINT SHAFT ASSEMBLY

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 616,551

[22] Filed: Jun. 1, 1984

[30] Foreign Application Priority Data

Jun. 13, 1983 [DE] Fed. Rep. of Germany ....... 3321351

[51] Int. Cl.⁴ .......................... F16D 3/40; B60K 17/22
[52] U.S. Cl. ...................................... 464/181; 464/183
[58] Field of Search ................. 248/65, 183, 184, 278; 403/57, 58, 74; 464/112, 113, 114, 125, 134, 135, 179, 181, 182, 183

[56] References Cited

U.S. PATENT DOCUMENTS

| 2,394,890 | 2/1946 | Blomgren | 464/112 |
|---|---|---|---|
| 3,553,978 | 1/1971 | Williams | 464/181 |
| 4,236,386 | 12/1980 | Yates et al. | 464/181 |
| 4,325,174 | 4/1982 | Smith et al. | 464/181 X |
| 4,436,515 | 3/1984 | Mallet | 464/114 |
| 4,449,955 | 5/1984 | Watanabe et al. | 464/179 X |

FOREIGN PATENT DOCUMENTS

| 54937 | 6/1982 | European Pat. Off. | 464/181 |
|---|---|---|---|
| 65242 | 5/1979 | Japan | 464/181 |

Primary Examiner—Stuart S. Levy
Assistant Examiner—Daniel P. Stodola
Attorney, Agent, or Firm—Toren, McGeady, Stanger, Goldberg & Kiel

[57] ABSTRACT

A universal joint assembly including a universally jointed transmission shaft formed with a tubular portion and made of fiber reinforced plastic material wherein a pair of opposed axially extending arms are provided on the shaft beyond the tubular portion, the arms being provided with bores which support therein opposed trunnions of a cross member of the universal joint, the arms being connected in supporting engagement by a reinforcing member which extends diametrically therebetween, the reinforcing member comprising a generally U-shaped bracket having limbs which engage the arm portions and a body portion extending between the limbs.

7 Claims, 6 Drawing Figures

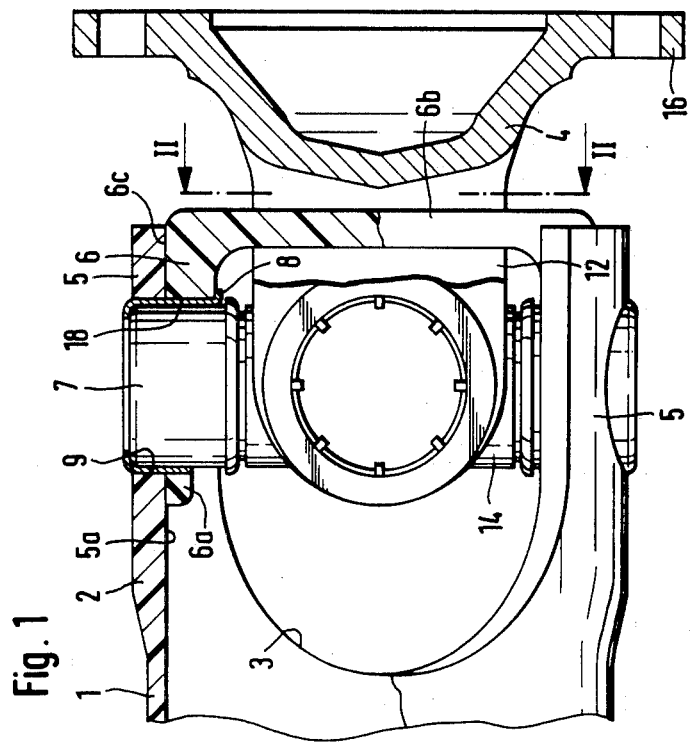
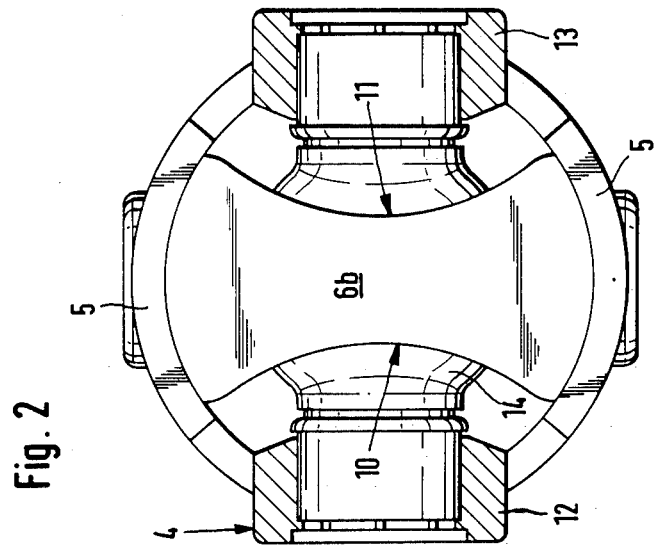

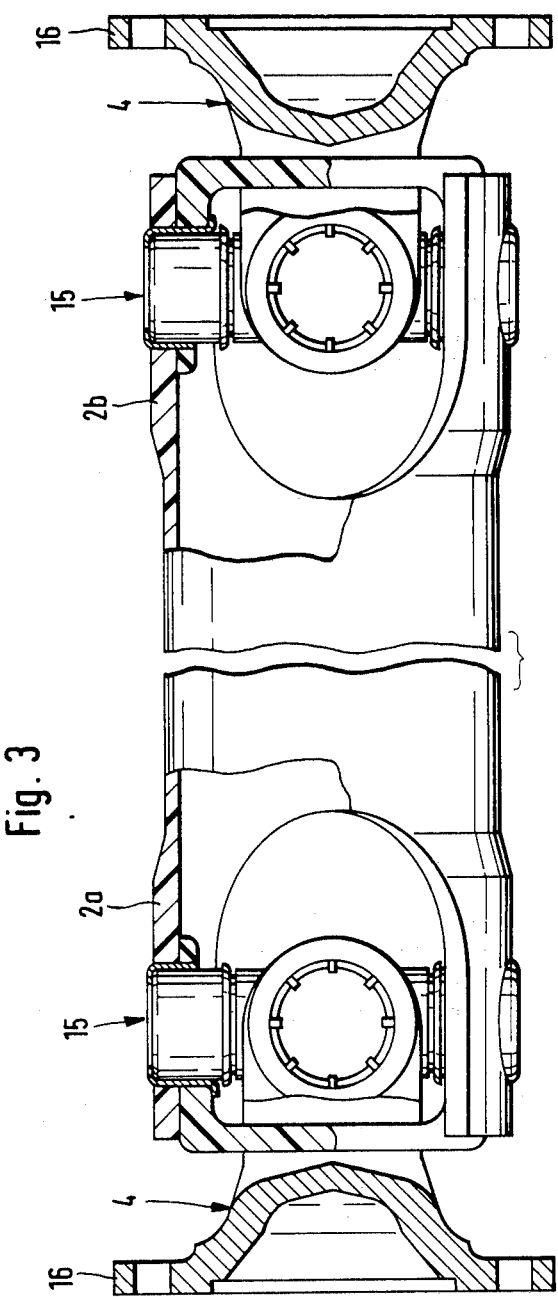

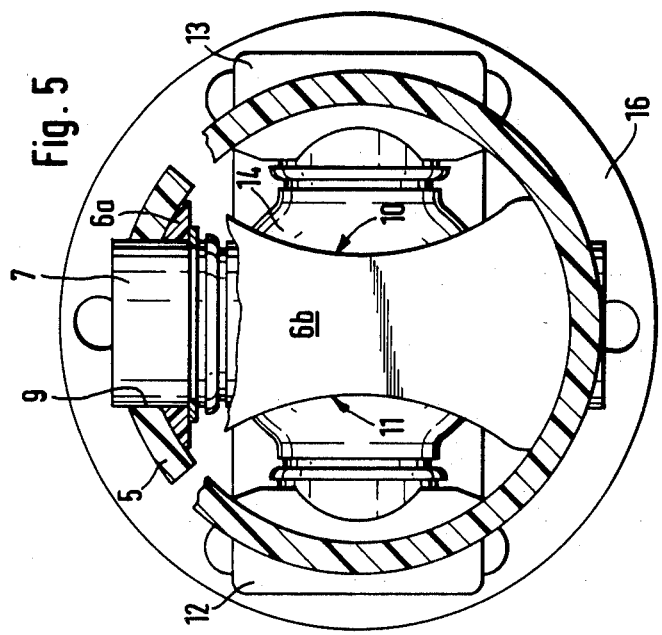
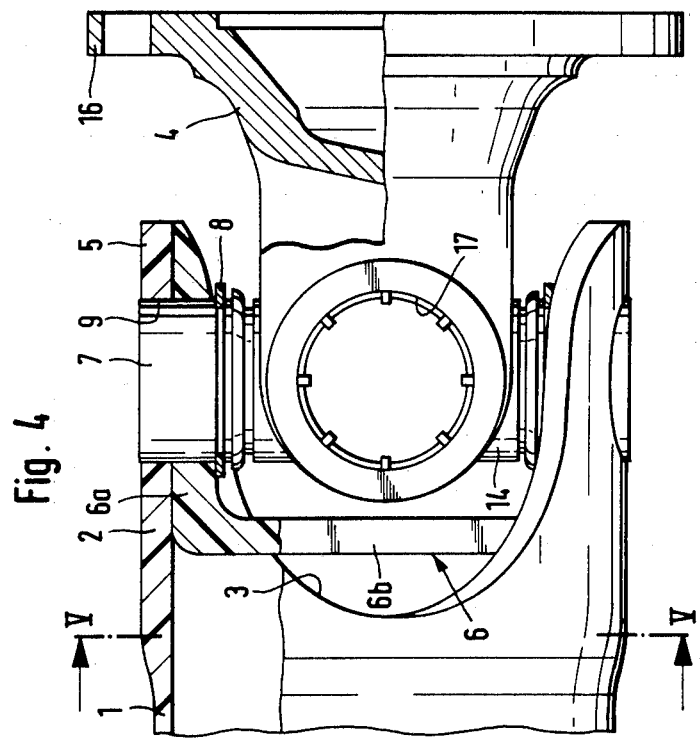

UNIVERSAL JOINT SHAFT ASSEMBLY

The present invention relates generally to universal joint assemblies and more particularly to the structure of a universal joint shaft which is made of composite fiber reinforced plastic material, the shaft being formed with a tubular configuration and having, at least at one of the ends thereof, a pair of diametrically opposed bores which support opposed trunnions of a Hookes universal joint cross member.

A universally jointed drive shaft of the type to which the present invention relates is disclosed in British Pat. No. 1 599 292. The tubular shaft disclosed is made by winding fibers impregnated with resin on a mandrel and the end portions of the shaft are thickened and formed with diametrically opposed bores which receive bearing cups supporting the trunnions of each of the joint cross members. The other two trunnions of each cross member are shorter than those supported in the tubular shaft and they are connected to a conventional joint yoke. In order to ensure a sufficiently large angle of possible articulation of the universal joint, the diameter of the shaft must be made relatively large, and larger than what would be necessary for torque transmission by the shaft.

It will be appreciated that, in a Hookes universal joint, the yokes of the joint must be designed in such a way that the arms of the yokes will safely withstand radial forces occurring during torque transmission. The arms of the yokes must not bend apart from one another end, in the case of Hookes joints, where the yokes are made of steel, this requirement is met due to the properties of the material which is used. In the case of a composite fiber reinforced plastic shaft, the strength is derived from the tubular configuration of the end portion of the shaft supporting the joint cross member and this gives rise to problems of excessive shaft diameter as discussed above.

A further problem associated with shaft assemblies of the type disclosed in British Pat. No. 1 599 292 is that the design of the cross member itself is constrained by the necessity of having pairs of trunnions of different lengths and the design of the cross member cannot be optimized.

Accordingly, the present invention is directed toward providing a shaft for a universal joint assembly which may be lighter in weight while avoiding the aforementioned disadvantages of the prior art and wherein the angle of articulation need not be limited, the tube diameter need not be made overly large and unsatisfactory designs of the cross member may be avoided. Furthermore, it is proposed to avoid the necessity for securing the conventional Hookes joint yoke to a fiber reinforced plastic shaft by use of adhesive fasteners or the like.

SUMMARY OF THE INVENTION

Briefly, the present invention may be described as a universal joint assembly comprising a shaft consisting essentially of fiber reinforced plastic material including a tubular portion, a pair of opposed axially extending arms formed at least at one end of said shaft extending beyond said tubular portion thereof, a pair of diametrically opposed bores one formed in each of said axially extending arms, a universal joint cross member having opposed trunnions, said opposed trunnions being supported in said diametrically opposed bores of said arms and a reinforcing member extending diametrically between said arm portions in supporting engagement therewith. With the present invention, the provision of the arm portions which are similar to the arms of a conventional Hookes joint yoke at the end of the tubular part of the shaft and the provision of the reinforcing member connecting the arm enables the assembly to exhibit a good articulation capability without requiring that the tubular shaft be of an excessively large diameter. The relative weakness of the arm portions of the shaft, as compared with a complete circular cross-section of the tubular portion of the shaft, is compensated by the provision of the reinforcing member which increases the bending and torsional stiffness of the arm portions. The reinforcing member may be formed of fiber reinforced plastics material or it may be made of a metallic material such as steel.

The reinforcing member is preferably formed as a generally U-shaped bracket having two limbs and a body portion extending between the limbs, with the limbs being arranged to engage the arms of the shaft. The limbs may have formations which engage bearing bushes which are received in the bores of the arms, said formations extending around more than half of the circumference of the bearing bushes. Preferably, the formations of the limbs may be in the form of bores and the bearing bushes may then be retained by retaining rings engaging inside surfaces of the reinforcing member limbs. This will ensure a secure fixing of the reinforcing member and also effective stiffening of the arm portions when subjected to bending or torsional stresses.

The body of the reinforcing member may have cutout portions which will facilitate articulation of the universal joint.

The body of the reinforcing member may be disposed to lie between the arms of a yoke which is connected to the two trunnions of the joint cross member other than the trunnions engaged within the bores of the diametrically opposed arms. In this case, if the dimensions of the assembly are appropriate, the reinforcing member may be capable of being fitted after assembly of the universal joint. It will be appreciated that the distance between the body of the reinforcing member and the joint cross member should be as small as possible in order to ensure high angles of articulation.

Alternatively, the body of the reinforcing member may extend between the arm portions of the shaft on the side of the cross member toward the tubular part of the shaft. In this case, the reinforcing member must be fitted to the shaft before assembly of the universal joint.

In a preferred embodiment of the invention, the axially extending arms of the shaft may be constructed with part-cylindrical inner surfaces and the limbs of the reinforcing member may have part-cylindrical outer surfaces shaped with the same diameter as the part cylindrical inner surfaces of the arms. The reinforcing member may thus closely engage with the arms so as to effectively reinforce the arms.

Alternatively, inner surfaces of the limbs of the reinforcing member and outer surfaces of the arms of the shaft may be formed with a part-cylindrical configuration of the same diameter. In the case where the body of the reinforcing member extends between the arms of the joint yoke connected to the other trunnions of the cross member, the reinforcing member may be simply be pushed onto the arms of the shaft. The limbs of the reinforcing member may engage parts of the bearing bushes outside of the shaft arms.

Of course, the tubular shaft and its arms need not be of a circular cross-section and, particularly, the end of the tubular shaft may have a rectangular cross-section.

The tubular shaft and its arm portions may be made from fiber reinforced plastic in which fibers are wound, e.g., helically, to form the shaft. The fibers may extend along the arm portions and around the bores which receive the bearing bushes so that torsion and bending loads in the arm portions will be effectively transmitted to the tubular shaft.

The reinforcing fibers may be glass fibers, carbon fibers, plastic fibers (e.g., polyamide), or metal wire (e.g., steel, beryllium). The plastics matrix in which the fibers are set may be polyepoxide or polyester resins.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DESCRIPTION OF THE DRAWINGS

In the drawings:

FIG. 1 is a lateral view, partly in section of a first embodiment of a universally jointed drive shaft in accordance with the invention;

FIG. 2 is a sectional view taken along the line II—II of FIG. 1;

FIG. 3 is a lateral view, partly in section, showing a drive shaft assembly having two universal joints, each similar to that shown in FIGS. 1 and 2;

FIG. 4 is a lateral view of a further embodiment of the invention shown partly in section;

FIG. 5 is a sectional view taken along the line V—V of FIG. 4; and

DETAILED DESCRIPTION OF THE PREFERRED EMBODIMENTS

Figure 6:
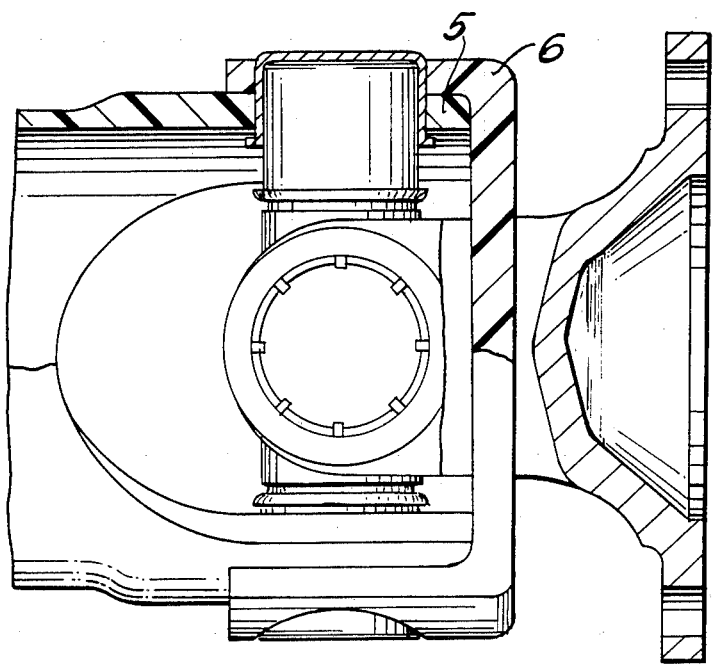
FIG. 6 is a lateral view of a further embodiment of the invention shown partly in section.

Referring first to FIGS. 1 and 2, wherein there is shown a first embodiment of the invention, the assembly of the invention is shown as comprising a tubular shaft 1 which is made of fiber reinforced plastic material, for example, glass fiber in polyester resin. At one end of the shaft 1, depicted in FIG. 1, the shaft is formed with two diametrically opposed arm portions 5 which extend axially beyond the tubular portion of the shaft. The arm portions 5 are formed with a wall thickness, indicated by reference numeral 2, which is increased as compared with the tubular portion of the shaft.

Each of the arms 5 is formed with a bore 9 extending therethrough, the bores 9 being aligned with one another in opposed relationship. Each of the bores 9 has supported therein a bearing bush 7, with the bearing bushes 7 arranged to support opposed trunnions of a joint cross member 14. The cross member 14 is supported in a conventional manner within the bushes 7, for example, with the interposition of needle roller bearings.

The other pair of trunnions of the cross member 14 is connected with a yoke member 4 provided with a flange 16 which enables the yoke 4 to be bolted to another torque transmitting component.

The assembly thus formed constitutes a Hookes universal joint with the arms 5 having cutout portions 3 therebetween to accommodate the arms of one yoke member of the joint.

In accordance with the invention, a reinforcing member or bracket 6 is provided between the arms 5, with the reinforcing member 6 being in the form of a generally U-shaped bracket having a pair of spaced limbs 6a, 6a and a body portion 6b. The limbs 6a are formed with part-cylindrical outer surfaces 6c which fit closely within part-cylindrical inner surfaces 5a of the arms 5. Bores 18 provided in the limbs 6a embrace the bearing bushes 7 by an angular distance slightly more than 180° of their respective circumferences. The reinforcing member 6 is firmly held by the arms 5 by fixing means 8.

The body 6b of the reinforcing member 6 lies between arms 12, 13 of the yoke 4. In order to provide for a reasonable possible angle of articulation of the universal joint, the body portion 6b of the reinforcing member 6 is provided with cutout portions 10, 11 on the sides thereof in order to accommodate the articulation of the joint.

A further embodiment of the invention is shown in FIG. 3. In the embodiment of FIG. 3, there is provided a shaft assembly which has at both its ends 2a, 2b a universal joint 15 such as that shown in FIGS. 1 and 2.

Referring now to FIGS. 4 and 5 of the drawings, there is shown therein a Hookes universal joint assembly formed at the end of a tubular fiber reinforced plastics shaft which is generally similar to the shaft shown in FIGS. 1 and 2. Accordingly, in FIGS. 4 and 5, like parts are indicated with the same reference numerals as are used in FIGS. 1 and 2. In the embodiment of FIGS. 4 and 5, however, the body portion 6b of the reinforcing member 6 is located to lie on the side of the cross member of the joint toward the tubular part of the shaft 1 in the otherwise empty space between the arm portions 5. In this embodiment, also, the body 6b of the reinforcing member 6 is formed with cutout portions 10, 11 which provide for articulation of the cross member 14 of the universal joint. Fixing means 8 secure bearing bushes 7 in the bores 9 of the arms 5 and limbs 6a of the reinforcing member 6.

The cutout sections 3 between the arms 5 of the shaft are relatively long and tend to weaken the assembly. However, by fitting the reinforcement member 6 in a position relatively close to the cross member 14, a high torque transmitting capability is achieved. At the same time, the articulation angle of the joint assembly is not restricted because of the cutout portions 10 and 11 in the reinforcement member 6.

As a possible alternative to the construction illustrated, the limbs 6a of the reinforcing member 6 may fit outside of the arms 5 rather than on the inside thereof. In this case, the limbs 6a may have part-cylindrical internal surfaces which engage the external surfaces of the arms 5. However, the tubular shaft 1 need not be circular in cross-section and could, for example, be of a square configuration. Thus, it will be seen that with the present invention there is provided a universal joint shaft assembly which consists of a torque transmission shaft or tube made of fiber reinforced plastic having at one end or at both ends a pair of opposed arms each of which contain a bore for receiving bearing bushes of a crosspiece of the joint. The arms are connected by the supporting bracket or reinforcing member of the invention and they are thereby stiffened against bending and torsional stress in order to provide high angular mobility without requiring that the tube diameter be unnecessarily enlarged.

While specific embodiments of the invention have been shown and described in detail to illustrate the application of the inventive principles, it will be understood that the invention may be embodied otherwise without departing from such principles.

What is claimed is:

1. A universal joint assembly comprising: a shaft consisting essentially of fiber reinforced plastic material and including a tubular portion, a pair of opposed axially extending arms formed at least at one end of said shaft extending beyond said tubular portion thereof, and a pair of diametrically opposed bores one formed in each of said axially extending arms; a universal joint cross member including opposed trunnions supported respectively in said diametrically opposed bores of said arms; a reinforcing member extending diametrically between said arms in supporting engagement therewith; and a yoke member in articulated engagement with said cross member to effect torque transmission with said shaft; said reinforcing member being formed with a generally U-shaped configuration having a pair of limbs and a body portion extending between said limbs, said limbs engaging said arms of said shaft with said body portions extending diametrically between said limbs across said opposed arms of said shaft, said limbs having formations which engage bearing bushes received in said bores and supporting said cross member and extending around more than half the circumference of said bearing bushes, said body portion of said reinforcing member being formed with cutout portions to provide clearance for movement relative thereto of said yoke member to enhance articulation of said joint assembly.

2. An assembly according to claim 1, wherein said body portion of said reinforcing member extends between said arm portions on the side of said cross member opposite said yoke member and toward said tubular part of said shaft.

3. An assembly according to claim 1, wherein said arms of said shaft are formed with part-cylindrical inner surfaces, and wherein said limbs of said reinforcing member arm formed with part-cylindrical outer surfaces having substantially the same diameter as said part-cylindrical inner surfaces of said arms with said limbs and said arms being thereby arranged in close engagement with each other.

4. An assembly according to claim 1, wherein said arms of said shaft are formed with part-cylindrical outer surfaces, and wherein said limbs of said reinforcing member are formed with part-cylindrical inner surfaces having substantially the same diameter as said part-cylindrical outer surfaces of said arms, said arms and said limbs being thereby arranged in close engagement with each other.

5. An assembly according to claim 1, wherein said body portion of said reinforcing member extends diametrically across said opposed arms of said shaft between said cross member and said yoke member.

6. An assembly according to claim 1, wherein said end of said shaft including said arms is formed with one of a square and rectangular cross-section.

7. An assembly according to claim 1, wherein said tubular part of said shaft and said arms are made by a fiber winding process.

* * * * *